(12) United States Patent
Homma et al.

(10) Patent No.: US 10,175,100 B2
(45) Date of Patent: *Jan. 8, 2019

(54) IMAGE DISPLAY APPARATUS AND CONTROL METHOD

(71) Applicant: SONY CORPORATION, Tokyo (JP)

(72) Inventors: Keisuke Homma, Kanagawa (JP); Yoshihisa Aikoh, Kanagawa (JP); Yuji Kato, Kanagawa (JP); Kazumasa Ikeura, Tokyo (JP); Tomomi Yuno, Kanagawa (JP); Shiun Sakai, Aichi (JP)

(73) Assignee: SONY CORPORATION, Tokyo (JP)

( * ) Notice: Subject to any disclaimer, the term of this patent is extended or adjusted under 35 U.S.C. 154(b) by 282 days.

This patent is subject to a terminal disclaimer.

(21) Appl. No.: 14/997,155

(22) Filed: Jan. 15, 2016

(65) Prior Publication Data

US 2016/0131522 A1 May 12, 2016

Related U.S. Application Data

(63) Continuation of application No. 14/503,773, filed on Oct. 1, 2014, now Pat. No. 9,271,376.

(30) Foreign Application Priority Data

Oct. 18, 2013 (JP) .................................. 2013-217442

(51) Int. Cl.
| | |
|---|---|
| *H05B 37/02* | (2006.01) |
| *H05B 33/08* | (2006.01) |
| *G01J 1/42* | (2006.01) |
| *G01J 1/04* | (2006.01) |
| *G01J 3/50* | (2006.01) |
| *G03B 21/00* | (2006.01) |
| *H04N 9/31* | (2006.01) |
| *G03B 21/20* | (2006.01) |

(52) U.S. Cl.
CPC ............... *G01J 1/42* (2013.01); *G01J 1/0407* (2013.01); *G01J 1/0488* (2013.01); *G01J 3/505* (2013.01); *G03B 21/00* (2013.01); *G03B 21/006* (2013.01); *G03B 21/2053* (2013.01); *H04N 9/3182* (2013.01); *H04N 9/3194* (2013.01); *H05B 33/0869* (2013.01); *H05B 37/0218* (2013.01); *G01J 2001/4247* (2013.01)

(58) Field of Classification Search
None
See application file for complete search history.

(56) References Cited

U.S. PATENT DOCUMENTS

| | | |
|---|---|---|
| 2005/0190172 A1 | 9/2005 | Koyama |
| 2012/0044328 A1* | 2/2012 | Gere .................. H04N 9/09 348/48 |

* cited by examiner

*Primary Examiner* — Jany Richardson
(74) *Attorney, Agent, or Firm* — Oblon, McClelland, Maier & Neustadt, L.L.P.

(57) ABSTRACT

There is provided an image display apparatus including: a light source unit; at least one light modulation device configured to modulate light from the light source unit, and to emit a modulated light beam; and a sensor configured to receive diffracted light of the modulated light beam emitted from the at least one light modulation device, and to measure intensity of the modulated light.

17 Claims, 10 Drawing Sheets

IMAGE DISPLAY APPARATUS AND CONTROL METHOD

CROSS REFERENCE TO RELATED APPLICATIONS

This application is a continuation of U.S. application Ser. No. 14/503,773 filed Oct. 1, 2014 and claims the benefit of Japanese Priority Patent Application JP 2013-217442 filed Oct. 18, 2013, the entire content of both of which are incorporated herein by reference.

BACKGROUND

The present disclosure relates to an image display apparatus such as a projector, and a method of controlling the image display apparatus.

In the past, an image display apparatus such as a projector is widely used. For example, according to Japanese Patent Application Laid-open No. H06-317777, a projector divides light from a light source into three primary colors i.e., RGB (red, green, and blue), projects the divided light onto a liquid crystal via filters, and displays the light on a screen.

As shown in FIG. 1 of Japanese Patent Application Laid-open No. H06-317777, in a projector 1, three primary colors reach a liquid crystal 8. A three-primary-color intensity detector 20 is a silicon photo diode and includes three-color color filters. The three-primary-color intensity detector 20 detects scattered light of the three primary colors. Then the three-primary-color intensity detector 20 outputs intensity of the three primary colors, i.e., a signal Z corresponding to red (R), a signal Y corresponding to green (G), and a signal X corresponding to blue (B), to a controller 30. The controller 30 calculates a correction value for correcting color shift based on the intensity of the three primary colors detected by the three-primary-color intensity detector 20 such that light projected onto the liquid crystal 8 may have a predetermined white color. The controller 30 outputs the correction value to a driving voltage generator 31. According to Japanese Patent Application Laid-open No. H06-317777, the correction value is calculated as described above, whereby it is possible to correct color shift easily and to reproduce a predetermined white color constantly (Japanese Patent Application Laid-open No. H06-317777, paragraphs [0021], [0022], [0027], etc.).

SUMMARY

As described above, in many cases, an image display apparatus such as a projector may perform calibration to correct white balance, gamma, and the like. It is desirable to provide a technology capable of performing calibration with a simple structure and with a high degree of accuracy.

In view of the above-mentioned circumstances, it is desirable to provide an image display apparatus capable of performing calibration with a simple structure and with a high degree of accuracy. It is desirable to provide a method of controlling the image display apparatus.

According to an embodiment of the present technology, there is provided an image display apparatus including a light source unit, at least one light modulation device, and a sensor.

The at least one light modulation device is configured to modulate light from the light source unit, and to emit a modulated light beam.

The sensor is configured to receive diffracted light of the modulated light beam emitted from the at least one light modulation device, and to measure intensity of the modulated light.

In the image display apparatus, the sensor receives diffracted light of light beam emitted from the light modulation device. Then intensity of the diffracted light is measured as intensity of modulated light. As a result, it is possible to perform calibration with a simple structure and with a high degree of accuracy.

The sensor may be arranged on a light path of the diffracted light of the light beam, the diffracted light having a predetermined order.

It is possible to calculate the light path of diffracted light having a predetermined order easily, and to arrange the sensor easily.

The at least one light modulation device may include a plurality of two-dimensionally arranged pixels, the plurality of two-dimensionally arranged pixels forming a periodic structure, the periodic structure being configured to generate the diffracted light.

The periodic structure formed by a plurality of pixels generates diffracted light. Intensity of the diffracted light is measured. As a result, it is possible to measure the intensity of the modulated light with a high degree of accuracy.

The image display apparatus may further include a projector configured to project incident light. In this case, the sensor may be configured to receive diffracted light failing to enter the projector out of the diffracted light of the light beam.

As a result, it is possible to measure the intensity of modulated light with a high degree of accuracy without blocking projection of an image by the projector.

Light from the light source unit may enter the at least one light modulation device approximately perpendicularly. In this case, the sensor may be configured to receive diffracted light having the smallest absolute value of an order out of the diffracted light failing to enter the projector.

As a result, it is possible to receive diffracted light having a large intensity. It is possible to measure the intensity of modulated light with a high degree of accuracy.

The light source unit may be capable of emitting light containing red light, green light, and blue light. In this case, the at least one light modulation device may include three light modulation devices, the three light modulation devices being configured to modulate the red light, the green light, and the blue light, respectively. Moreover, the image display apparatus may further include a synthesizer unit, the synthesizer unit being configured to synthesize red modulated light, green modulated light, and blue modulated light modulated by the three light modulation devices. Moreover, the sensor may be configured to receive diffracted light of a light beam synthesized by the synthesizer unit, and to measure intensity of the red modulated light, the green modulated light, and the blue modulated light.

The image display apparatus modulates three-color (RGB) light, and synthesizes the RGB modulated lights. As a result, it is possible to display a color image. It is possible to receive diffracted light of a synthesized light beam, and to measure the intensity of the RGB modulated lights. As a result, is it possible to correct white balance or the like with a simple structure and with a high degree of accuracy.

The synthesizer unit may include an emitter surface configured to emit the synthesized light beam. In this case, the sensor may be arranged in the vicinity of the emitter surface.

As a result, it is possible to perform calibration with a simple structure.

The sensor may include a plurality of sensor units capable of measuring intensity of incident light, and a plurality of filters arranged on the plurality of sensor units, respectively, the plurality of filters being configured to transmit light having a predetermined wavelength band.

As a result, it is possible to measure the intensity of the RGB modulated lights with a high degree of accuracy.

The plurality of filters may include three kinds of filters, the three kinds of filters being first filters configured to transmit light having a red wavelength band, second filters configured to transmit light having a green wavelength band, and third filters configured to transmit light having a blue wavelength band. In this case, the plurality of sensor unit may be two-dimensionally arranged in a first direction and a second direction, the first direction and the second direction being orthogonal to each other. Moreover, in arrangement of the plurality of filters, a group of filters aligned in the first direction includes the three kinds of filters, and the same kinds of filters out of the three kinds of filters fail to adjacent to each other in the second direction.

As a result, it is possible to measure the intensity of the RGB modulated lights with a high degree of accuracy.

The plurality of filters may include fourth filters, the fourth filters being configured to transmit light having a noise component, the three kinds of filters being configured to transmit the light having the noise component, and in the arrangement of the plurality of filters, the group of filters aligned in the first direction may include the fourth filter, and the fourth filters fail to adjacent to each other in the second direction.

As a result, it is possible to measure the intensity of the RGB modulated lights with a high degree of accuracy.

The image display apparatus may further include a controller capable of controlling at least one of the light source unit and the at least one light modulation device based on the measured intensity of the modulated light.

As a result, it is possible to produce an image with a high degree of accuracy.

According to an embodiment of the present technology, there is provided a control method including: receiving diffracted light of a modulated light beam emitted from a light modulation device, the light modulation device being configured to modulate light from a light source unit and to emit light;

measuring intensity of the light; and controlling at least one of the light source unit and the light modulation device based on the measured intensity of the light.

According to the control method, the light modulation device emits a light beam. The sensor receives diffracted light of the light beam. The intensity of the light is measured. At least one of the light source unit and the light modulation device is controlled based on the intensity of the light. As a result, it is possible to perform calibration or the like to correct the intensity of the modulated light with a simple structure and with a high degree of accuracy. Moreover, it is possible to produce an image with a high degree of accuracy.

As described above, according to the present technology, it is possible to perform calibration with a simple structure and with a high degree of accuracy. Note that effects of the present technology are not necessarily limited to the above-mentioned effects. Any one of the effects described in the present disclosure may be attained.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

[Image Display Apparatus]

Figure 1:
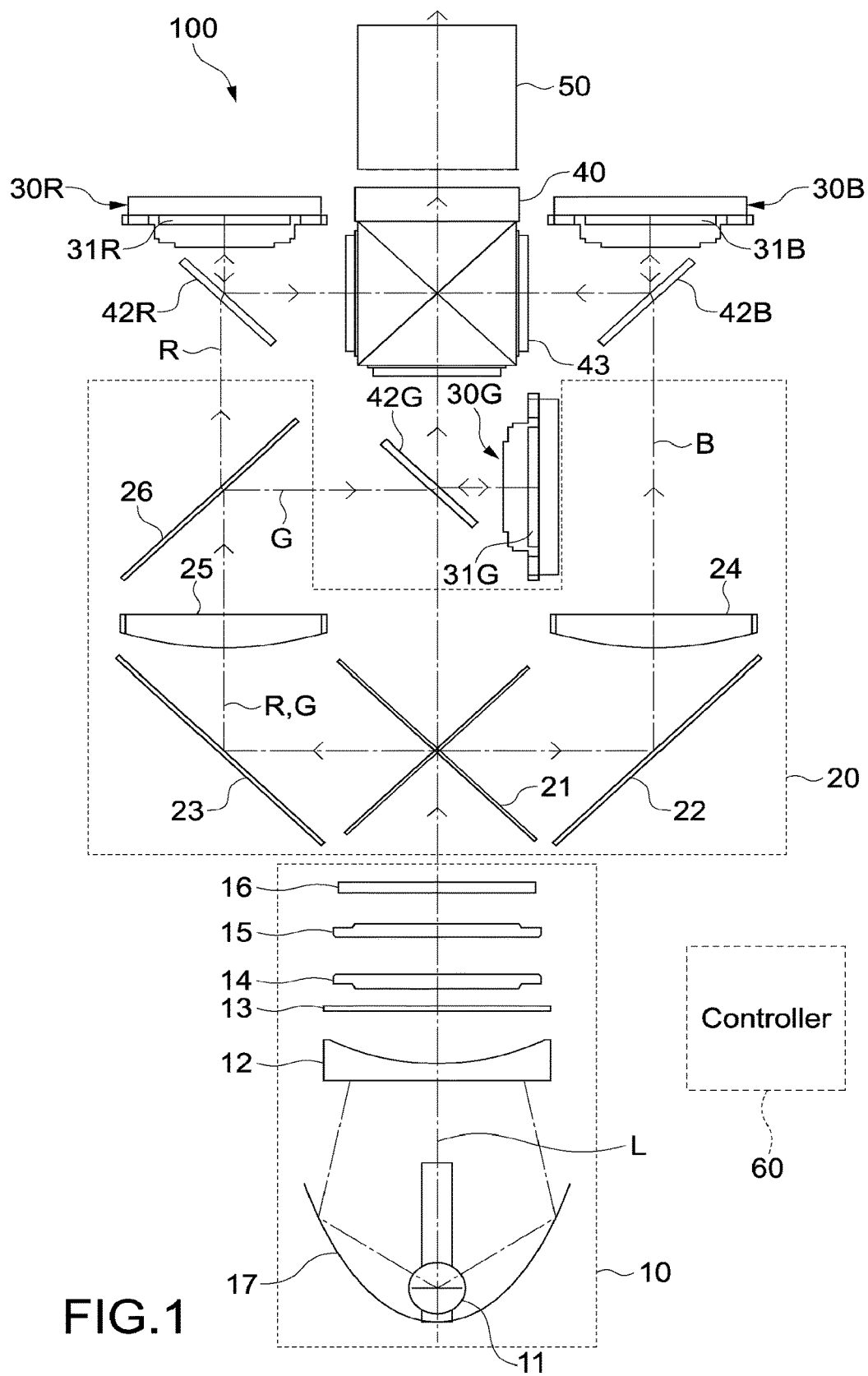
FIG. 1 is a diagram schematically showing an example of the structure of an image display apparatus according to an embodiment of the present technology.

FIG. 1 is a diagram schematically showing an example of the structure of an image display apparatus according to an embodiment of the present technology. An image display apparatus 100 modulates red light, green light, and blue light (RGB lights) independently. The image display apparatus 100 synthesizes the modulated red light (image), the modulated green light (image), and the modulated blue light (image). As a result, the image display apparatus 100 projects and displays a color image. The image display apparatus 100 is used as a projector for digital cinema, for example. The present technology is applicable to a display apparatus for another purpose.

As shown in FIG. 1, the image display apparatus 100 includes an lighting optical system 10, a spectro-optical system 20, and three liquid crystal display units 30 (30R, 30G, and 30B). The lighting optical system 10 emits light L. The spectro-optical system 20 disperses the light L emitted from the lighting optical system 10. The three liquid crystal display units 30 (30R, 30G, and 30B) modulate the light L. The image display apparatus 100 further includes a light synthesizer unit 40 and a projector optical system 50. The light synthesizer unit 40 synthesizes the light L modulated by the three liquid crystal display units 30R, 30G, and 30B. The projector optical system 50 projects the light L synthesized by the light synthesizer unit 40. A reflective polarizing device 42R is provided between the spectro-optical system 20 and the liquid crystal display unit 30R. A reflective polarizing device 42G is provided between the spectro-optical system 20 and the liquid crystal display unit 30G. A reflective polarizing device 42B is provided between the spectro-optical system 20 and the liquid crystal display unit 30B.

The lighting optical system 10 includes a light source 11, a concave lens 12, a UV cutoff filter 13, a first fly-eye lens 14, a second fly-eye lens 15, and a condenser lens 16. The concave lens 12 forms the light L emitted from the light source 11 into approximately parallel light. In this embodiment, the lighting optical system 10 functions as a light source unit capable of emitting light containing red light, green light, and blue light.

The light source 11 is, for example, a xenon lamp, a halogen lamp, an ultrahigh-pressure mercury lamp, or the like. A reflector 17 is provided around the light source 11. The reflector 17 reflects the light L emitted from the light source 11. The light L reflected by the reflector 17 enters the concave lens 12. The light L passes through the concave lens 12 and enters the UV cutoff filter 13. The UV cutoff filter 13 removes ultraviolet light.

The light source 11 may be any kind. For example, the light source 11 may be an LD (Laser Diode) capable of emitting laser light, or a solid light source such as an LED (Light Emitting Diode). For example, solid RGB light sources capable of emitting RGB lights, respectively, may be prepared. The emitted RGB lights may be synthesized, whereby white light is produced. Alternatively, a solid light source and a fluorescence material may be prepared. The solid light source emits light having a blue wavelength band. The fluorescence material is excited by blue light, and generates yellow fluorescence. In this case, the blue light and the yellow light are synthesized, whereby white light is emitted.

The light L passes through the UV cutoff filter 13, and enters the first and second fly-eye lenses 14 and 15. If the light L passes through the first and second fly-eye lenses 14 and 15, uneven brightness of the light L is reduced. The light L passes through the first and second fly-eye lenses 14 and 15, and enters the condenser lens 16. The condenser lens 16 collects the incident light, and emits the light to the spectro-optical system 20.

The spectro-optical system 20 includes a first dichroic mirror 21, two reflecting mirrors 22 and 23, two collecting lenses 24 and 25, and a second dichroic mirror 26. The first dichroic mirror 21 disperses the light L emitted from the lighting optical system 10 into blue light B having a shorter wavelength, and red light R and green light G having longer wavelengths. The first reflecting mirror 22 reflects the blue light B, which is dispersed by the first dichroic mirror 21. The blue light B enters the first collecting lens 24. Then the first collecting lens 24 collects the blue light B. The blue light B passes through the reflective polarizing device 42B, and enters the liquid crystal display unit 30B. The reflective polarizing device 42B is a prism beam splitter, a wire grid polarizer, or the like.

The second reflecting mirror 23 reflects the red light R and the green light G, which are dispersed by the first dichroic mirror 21. The red light R and the green light G enters the second collecting lens 25. Then the second collecting lens 25 collects the red light R and the green light G, and emits the red light R and the green light G to the second dichroic mirror 26. The second dichroic mirror 26 disperses the red light R and the green light G into the green light G having a shorter wavelength and the red light R having a longer wavelength. The dispersed red light R passes through the reflective polarizing device 42R, and enters the liquid crystal display unit 30R. The green light G passes through the reflective polarizing device 42G, and enters the liquid crystal display unit 30G.

The liquid crystal display units 30R, 30G, and 30B include reflective liquid crystal panels 31 (31R, 31G, and 31B), respectively. The reflective liquid crystal panels 31R, 31G, and 31B modulate the RGB lights R, G, and B, which entered the liquid crystal display units 30R, 30G, and 30B, into image lights having intensity distributions corresponding to RGB image information, respectively. The reflective liquid crystal panels 31R, 31G, and 31B reflect the image lights, respectively. Then the reflective polarizing devices 42R, 42G, and 42B reflect the three kinds of modulated image lights (arbitrarily referred to as red modulated light R, green modulated light G, and blue modulated light B), respectively. The three kinds of modulated image lights enter the light synthesizer unit 40. At this time, polarizers 43 of the light synthesizer unit 40 align the polarization directions of the RGB modulated lights. As a result, the contrast is increased.

In this embodiment, the liquid crystal panels 31 correspond to "at least one light modulation device configured to modulate light from the light source unit, and to emit a modulated light beam". In other words, the three liquid crystal panels 31R, 31G, and 31B function as three light modulation devices configured to modulate red light, green light, and blue light, respectively.

The light synthesizer unit 40 is, for example, a dichroic prism or the like. The light synthesizer unit 40 synthesizes the three kinds of modulated lights, which are modulated by the liquid crystal display units 30R, 30G, and 30B, respectively, on a single light path. The light synthesizer unit 40 emits the synthesized light to the projector optical system 50. Then the projector optical system 50 enlarges the synthesized light at a predetermined magnification. The projector optical system 50 projects the enlarged synthesized light on a screen (not shown). As a result, a color image is displayed.

In this embodiment, the light synthesizer unit 40 corresponds to "a synthesizer unit, the synthesizer unit being configured to synthesize red modulated light, green modulated light, and blue modulated light modulated by the three light modulation devices". Moreover, the projector optical system 50 corresponds to "a projector configured to project incident light". The specific structures of the light synthesizer unit 40 and the projector optical system 50 are not limited, and may be designed as necessary.

Moreover, the image display apparatus 100 includes a controller 60. The controller 60 is capable of controlling operations of the mechanisms of the apparatus. The controller 60 electrically connects to the lighting optical system 10, the spectro-optical system 20, the liquid crystal display units 30, the projector optical system 50, and other mechanisms. The controller 60 outputs control signals to those mechanisms. For example, the controller 60 is capable of controlling operations of the light source 11 of the lighting optical system 10 and operations of the liquid crystal panels 31 based on the intensities of the RGB modulated lights (described later).

The controller 60 includes, for example, a CPU, a RAM, a ROM, and the like. The ROM prestores a controller program, the CPU loads the controller program in the RAM, and the CPU thus controls the mechanisms. The configuration of the controller 60 is not limited. Arbitrary hardware and software may be used for the controller 60. For example, a PLD (Programmable Logic Device) such as an FPGA (Field Programmable Gate Array) or a device such as an ASIC (Application Specific Integrated Circuit) may be used. Moreover, in FIG. 1, a dashed square shows the controller 60. The location of the controller 60 is not limited but may be selected as necessary.

The image display apparatus 100 of this embodiment includes a sensor (not shown in FIG. 1). The sensor is capable of measuring the intensities of the RGB modulated lights, which are modulated by the liquid crystal panels 31. Hereinafter, the sensor will be described in detail.

Figure 2:
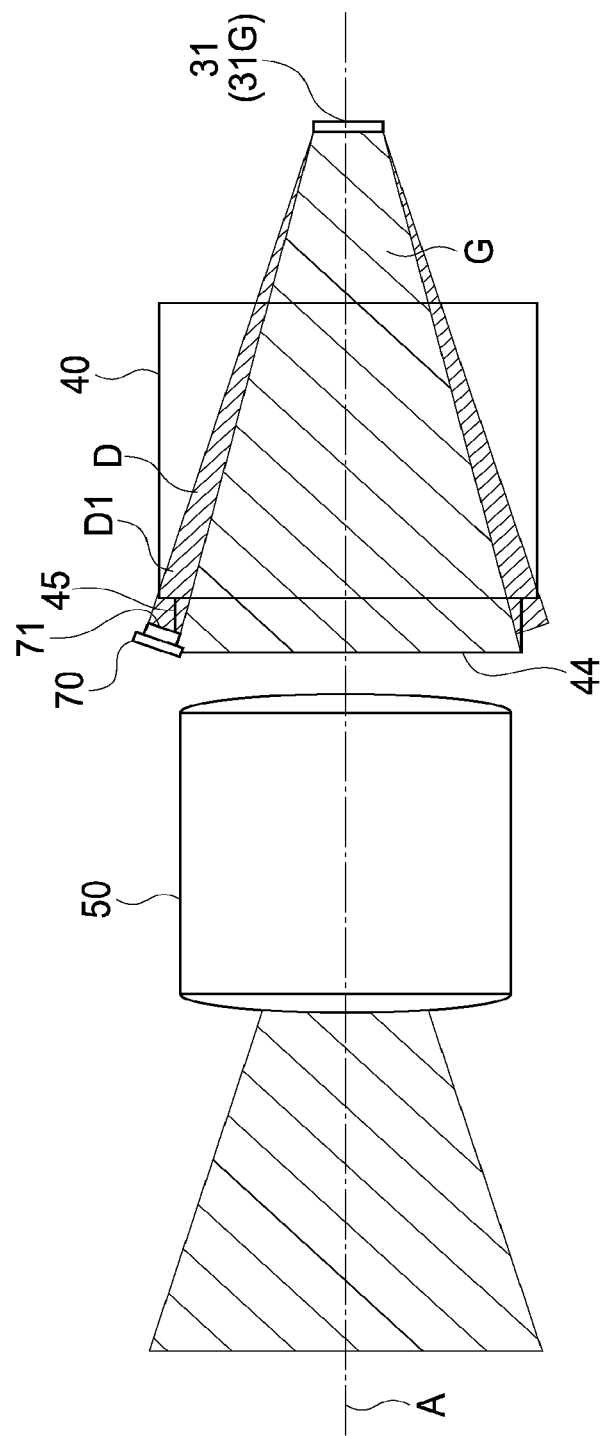
FIG. 2 is a diagram schematically showing the structure between a liquid crystal panel and a projector optical system.

FIG. 2 is a diagram schematically showing the structure from the liquid crystal panel 31 to the projector optical system 50. In FIG. 2, the liquid crystal panel 31G, the light synthesizer unit 40, and the projector optical system 50 are aligned along an optical axis A. The liquid crystal panel 31G modulates green light, and emits the green modulated light G. As shown in FIG. 1, the reflective polarizing device 42G is arranged between the liquid crystal panel 31G and the light synthesizer unit 40. The reflective polarizing device 42G reflects the green modulated light G. As a result, the beam of the green modulated light G enters the light synthesizer unit 40. For simplicity, in FIG. 2, the reflective polarizing device 42G is not shown, and the liquid crystal panel 31G is arranged on the optical axis A.

Moreover, as shown in FIG. 1, the red modulated light R and the blue modulated light B also enter the light synthesizer unit 40. For example, the red modulated light R enters the light synthesizer unit 40 in the negative direction along the Y axis (perpendicular to sheet). Moreover, the blue modulated light B enters the light synthesizer unit 40 in the positive direction along the Y axis.

Then the light synthesizer unit 40 synthesizes the RGB modulated lights R, G, and B. The light synthesizer unit 40 emits the white light beam to the projector optical system 50. The light synthesizer unit 40 includes an emitter surface 44 configured to emit the synthesized light beam. The emitter surface 44 emits the white light beam to the projector optical system 50. So, in FIG. 2, the beam of the green modulated light G enters the light synthesizer unit 40, and the white light beam exists in the vicinity of the emitter surface 44 of the light synthesizer unit 40.

Hereinafter, in the description of the sensor, first, a case where only the green modulated light G enters the light synthesizer unit 40 will be described.

In FIG. 2, the liquid crystal panel 31G emits the beam of the green modulated light G. The sensor 70 receives the diffracted light D of the beam of the green modulated light G. The sensor 70 measures the intensity of the green modulated light G. So the sensor 70 is arranged on a light path of the diffracted light D_of the light beam, the diffracted light having a predetermined order. In this embodiment, the sensor 70 is arranged on the light path of the diffracted light D and in the vicinity of the emitter surface 44 of the light synthesizer unit 40. As a result, it is possible to receive the diffracted light D without a complicated structure.

In many cases, the distribution of the diffracted light D is as follows. The largest intensity is at the center. The larger the distance from the center, the smaller the intensity. In view of this distribution, as shown in FIG. 2, the sensor 70 is arranged such that the sensor 70 may be capable of receiving a light beam (beam of diffracted light) D1. The light beam D1 is spread out in a predetermined zone from the center of the diffracted light D. As a result, the sensor 70 is capable of measuring the intensity of the green modulated light G with a high degree of accuracy. Note that, in FIG. 2, the sensor 70 is arranged such that the receiver surface 71 of the sensor 70 may be perpendicular to the incidence direction of the diffracted light D. Alternatively, the sensor 70 may be arranged such that the receiver surface 71 may be oblique to the incidence direction of the diffracted light D. For example, the sensor 70 may be arranged on the side surface 45, which is in the vicinity of the emitter surface 44 of the light synthesizer unit 40.

Figure 3:
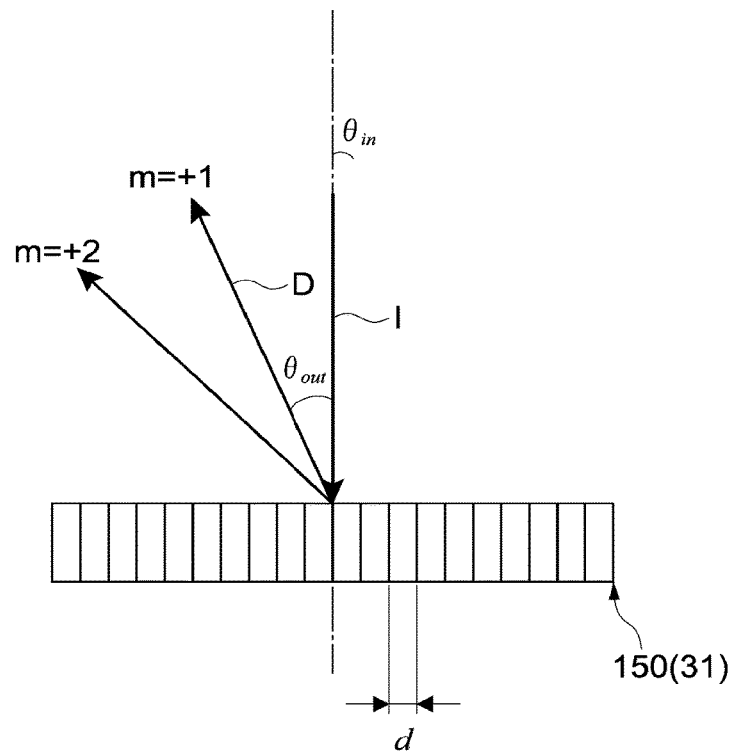
FIG. 3 is a diagram schematically illustrating diffracted light emitted from liquid crystal panels.

FIG. 3 is a diagram schematically illustrating the diffracted light D emitted from the liquid crystal panels 31. The following mathematical formula (1) is given where d is the pitch of the diffraction grating 150 of FIG. 3, $\theta_{in}$ is the incidence angle of the incident light I, and the $\theta_{out}$ is the angle of the diffracted light.

$$d(\sin\theta_{in} + \sin\theta_{out}) = m\lambda \quad (1)$$

d Panel pitch of diffraction grating
$\theta_{in}$ Incidence angle (angle of light entering panel)
$\theta_{out}$ Angle of diffracted light (angle of diffracted light diffracted by panel. Diffracted light enters sensor)
$\lambda$ Wavelength
m Diffracted order (desired diffracted order is set)

The liquid crystal panel 31 includes a plurality of two-dimensionally-arranged pixels. The plurality of pixels form a periodic structure. The periodic structure of the liquid crystal panel 31 generates diffracted light. In other words, the liquid crystal panels 31 functions as the diffraction grating 150 for the incident light. The pitch d of the diffraction grating 150 of FIG. 3 corresponds to the pixel pitch of the liquid crystal panel 31. The length of the pixel pitch d may be selected as necessary depending on, for example, the resolution (number of pixels) of an image to be produced.

In this embodiment, the light from the lighting optical system 10 enters the liquid crystal panels 31 approximately perpendicularly. So the RGB lights enter the liquid crystal panels 31 similar to the incident light I of FIG. 3 ($\theta_{in}$=0). As a result, the liquid crystal panel 31 reflects the diffracted light D, and the diffracted light D travels to the light synthesizer unit 40 at the diffracted light angle $\theta_{out}$. The diffracted light angle $\theta_{out}$ is obtained by the following mathematical formula (2). The mathematical formula (2) is a modification of the mathematical formula (1).

$$\theta_{out} = \sin^{-1}\left(\frac{m\lambda - d\sin\theta_{in}}{d}\right) \quad (2)$$

For example, the wavelength $\lambda$ is the wavelength having the peak emission intensity in the wavelength band of each color. Note that RGB wavelength bands are not limited, and the wavelength having the peak intensity of each color is not limited. They are selected as necessary. A light source capable of emitting light, from which RGB lights having desired wavelength bands and desired peak wavelengths are to be obtained, may be used as necessary.

The order m may be selected as necessary. The diffracted light D, whose intensity is to be measured, is determined. An order m corresponding to the diffracted light D may be substituted. In addition, the diffracted light angle $\theta_{out}$ is calculated by substituting the parameter values in the mathematical formula (2). The position of the sensor 70 may be selected easily based on information on the diffracted light angle $\theta_{out}$.

Figure 4:
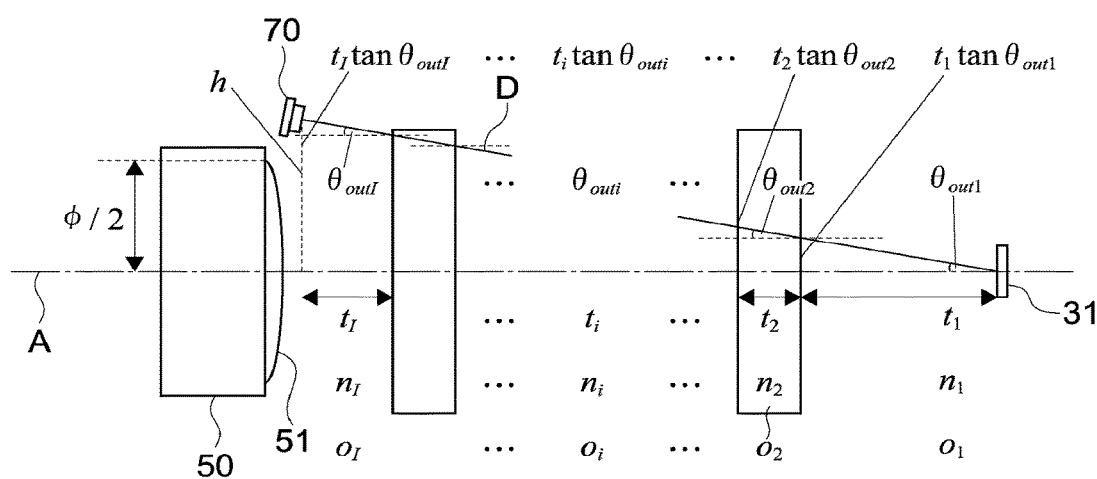
FIG. 4 is a diagram illustrating the position of a sensor in detail.

FIG. 4 is a diagram illustrating the position of the sensor 70 in detail. In this embodiment, the sensor 70 is arranged at a position at which the sensor 70 is capable of receiving part of the diffracted light D, which does not enter the projector optical system 50, out of the diffracted light D of the light beam emitted from the liquid crystal panels 31. Moreover, the sensor 70 is arranged at a position at which the sensor 70 is capable of receiving part of the diffracted light D, which has the smallest absolute value of the order m, out of the diffracted light D, which does not enter the projector optical system 50. For example, the position, at which the sensor 70 is capable of receiving such a diffracted light D, is calculated as follows.

Generally, the light synthesizer unit 40 and in addition a plurality of members are arranged between the liquid crystal panel 31 and the sensor 70. For example, a polarizer, a polarizer base, panel a compensator, a back focusing glass, adhesive materials, a 4P prism (light synthesizer unit 40) may be arranged. The diffracted light D travels through those members and air layers between those members. FIG. 4 shows those members (including air layers) $O_i$. A member $O_1$, a member $O_2$ ... a member $O_T$ are arranged between the liquid crystal panel 31 and the sensor 70 in this order. The member $O_i$ has a thickness $t_i$ and a refractive index $n_i$.

The incidence angle $\theta_{in}$ of light entering the liquid crystal panels 31 is known ($\theta_{in}=0$). $\sin \theta_{out1}$ is thus calculated based on the following mathematical formula (3). The mathematical formula (3) is a modification of the above-mentioned mathematical formula (1).

$$\sin\theta_{out1} = \frac{m\lambda}{d} - \sin\theta_{in} \qquad (3)$$

Moreover, the following mathematical formula (4) is given for the adjacent member $O_i$.

$$n_i \sin \theta_{outi} = n_{i-1} \sin \theta_{outi-1} \qquad (4)$$

$\sin \theta_{outi}$ of each member $O_i$ is calculated based on the mathematical formula (4). As a result, $\tan \theta_{outi}$ of each member $O_i$ is also calculated. Here, (t, h) is the position of the sensor 70 relative to the liquid crystal panel 31, the members $O_i$, and the projector optical system 50, which are arranged on the optical axis A. t is the distance from the liquid crystal panel 31 in the optical axis direction. h is the distance from the liquid crystal panel 31 in the direction orthogonal to the optical axis direction. In other words, the sensor 70 is arranged at a position distant from the liquid crystal panels 31 by the distance t and the distance h. The sensor 70 at the position (t, h) is capable of receiving the diffracted light D having a predetermined order m. In other words, the sensor 70 is on the light path of the diffracted light D having the predetermined order m. With reference to FIG. 4, the distance t and the distance h are calculated based on the following mathematical formula (5) and mathematical formula (6).

$$t = \sum_{i=1}^{I} t_i \qquad (5)$$

$$h = \sum_{i=1}^{I} t_i \tan\theta_{outi} \qquad (6)$$

Here, the size of the entrance area 51 of the projector optical system 50 in the direction orthogonal to the optical axis direction is $\phi$. The entrance area 51 is capable of capturing the light traveling from the liquid crystal panels 31. The diffracted light D entering the entrance area 51 is the diffracted light D entering the projector optical system 50. If the following mathematical formula (7) is satisfied, then the sensor 70 is capable of receiving part of the diffracted light D, which does not enter the projector optical system 50.

$$h > \phi/2 \qquad (7)$$

The order m having the smallest absolute value may be selected out of the order m based on which the distance h satisfying the mathematical formula (7) is calculated. As a result, the sensor 70 is capable of receiving part of the diffracted light D having the smallest absolute value of the order m out of the diffracted light D, which does not enter the projector optical system 50.

The sensor 70 receives the part of the diffracted light D, which does not enter the projector optical system 50. As a result, it is possible to measure the intensity of modulated light without blocking projection of an image by the projector optical system 50. Moreover, in many cases, the smaller the absolute value of the order m of the diffracted light D, the larger the intensity of the light. So it is possible to measure the intensity of the modulated light with a high degree of accuracy by receiving such a diffracted light D. Moreover, the diffracted light D having the smallest absolute value of the order m is in the vicinity of the optical axis A. So it is possible to arrange the sensor 70 in the vicinity of the optical axis A. It is possible to arrange the sensor 70 with a simple structure without changing the arrangement of the other members. Moreover, the image display apparatus 100 may be downsized.

As described above, it is possible to calculate the position on which the sensor 70 is to be arranged easily. As a matter of course, the calculation method is not limited to the above-mentioned method. Alternatively, the position of the sensor 70 may be calculated as necessary based on the property of the diffracted light D, the arrangement and the property of the members, and the like.

In the above description about the sensor 70, only the beam of the green modulated light G enters the light synthesizer unit 40. The above description is applicable to the case where only modulated light of another color enters the light synthesizer unit 40. Moreover, the position of the liquid crystal panels 31, the positions of the other members, the pixel pitches, and the like are selected as necessary. As a result, the light paths of the RGB diffracted lights D travelling to the projector optical system 50 may be approximately the same. In other words, the diffracted lights having a predetermined order m of the RGB light beams may enter the single sensor 70 of FIG. 2.

In this embodiment, the center of the diffracted light D of each color is within a predetermined zone (for example, zone of light beam D1 of diffracted light D of FIG. 2). The sensor 70 is arranged such that the sensor 70 may be capable of receiving synthetic light in the zone. As a result, it is possible to receive the RGB diffracted lights D sufficiently, and to measure the intensities of the RGB modulated lights with a high degree of accuracy.

Moreover, typically, the diffracted lights D having the same order m of the RGB light beams enter the sensor 70. Moreover, the sensor 70 receives the RGB diffracted lights D, which do not enter the projector optical system 50 and have the smallest absolute value of the order m. Alternatively, the sensor 70 may receive RGB diffracted lights D having different orders.

Figure 5:
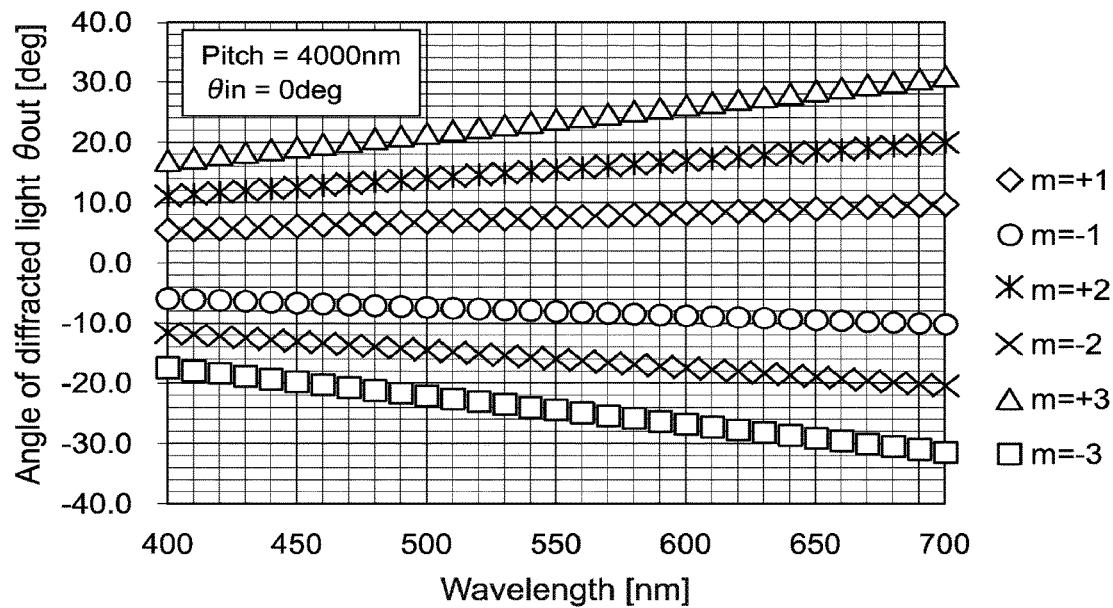
FIG. 5 is a graph showing the relation of a wavelength, a diffracted light angle, and an order.

FIG. 5 is a graph showing the relation of the wavelength $\lambda$, the diffracted light angle $\theta_{out}$, and the order m. FIG. 5 shows results of a case where a liquid crystal panel having the pixel pitch d=4000 nm is used and where the incidence angle $\theta_{in}$ is 0°.

As shown in the graph of FIG. 5, the smaller the absolute value of the order m of diffracted light, the smaller the diffracted light angle $\theta_{out}$ (closer to 0°). Moreover, the larger the wavelength Δ, the larger the diffracted light angle $\theta_{out}$ (farther from 0°). The position of the sensor may be calculated as necessary based on such properties. Note that it is understood that the diffracted light angles $\theta_{out}$ are different depending on the RGB colors as apparent from the relation between the wavelength Δ and the diffracted light angle $\theta_{out}$ of the graph. However, in a case of receiving diffracted lights having the same order m, the difference of the diffracted light angles $\theta_{out}$ depending on the RGB colors is sufficiently small. In view of this, it is relatively easy to design the image display apparatus 100 such that the centers of the RGB diffracted light may be in a predetermined zone.

Figure 6:
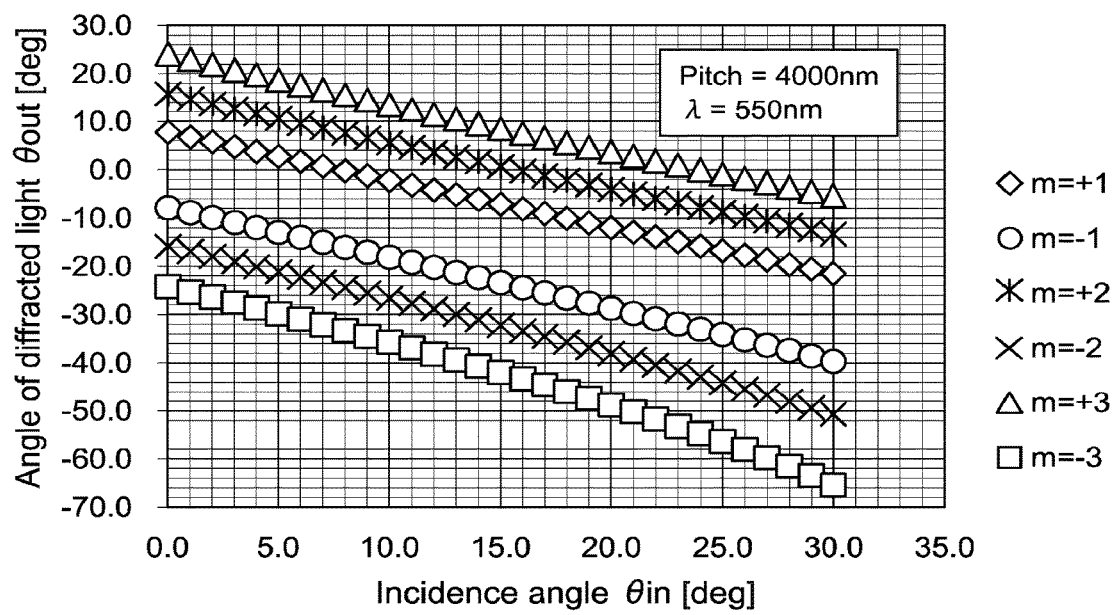
FIG. 6 is a graph showing the relation of an incidence angle, a diffracted light angle, and an order.

FIG. 6 is a graph showing the relation of the incidence angle $\theta_{in}$, the diffracted light angle $\theta_{out}$, and the order m. Here, the liquid crystal panel having the pixel pitch d=4000 nm is used, and the light having the wavelength Δ=550 nm is used. As shown in the graph, the larger the incidence angle $\theta_{in}$, the smaller the diffracted light angle $\theta_{out}$ (if the incidence angle $\theta_{in}$ increases, the diffracted light angle $\theta_{out}$ decreases). The position of the sensor may be calculated as necessary based on such a property. Typically, the incidence angle $\theta_{in}$ of the light entering the liquid crystal panel is 0°. However, the present technology is applicable to the case where the incidence angle $\theta_{in}$ is not 0°. It is possible to calculate the position of the sensor as necessary based on the property of FIG. 6 and the like.

Figure 7:
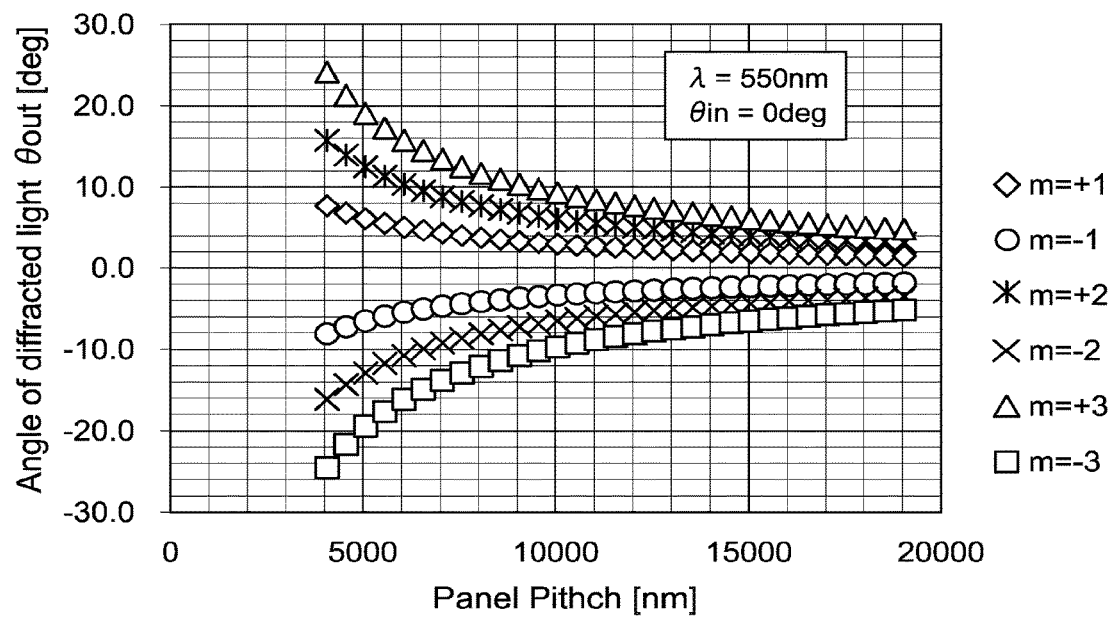
FIG. 7 is a graph showing the relation of a pixel pitch, a diffracted light angle, and an order.

FIG. 7 is a graph showing the relation of the pixel pitch d, the diffracted light angle $\theta_{out}$, and the order m. FIG. 7 shows the results of the case where the wavelength λ of the incident light is 550 nm and the incidence angle $\theta_{in}$ is 0°. As shown in the graph, the larger the pixel pitch d, the closer to 0° the diffracted light angle $\theta_{out}$. The position of the sensor may be calculated arbitrarily based on the property.

Figure 8:
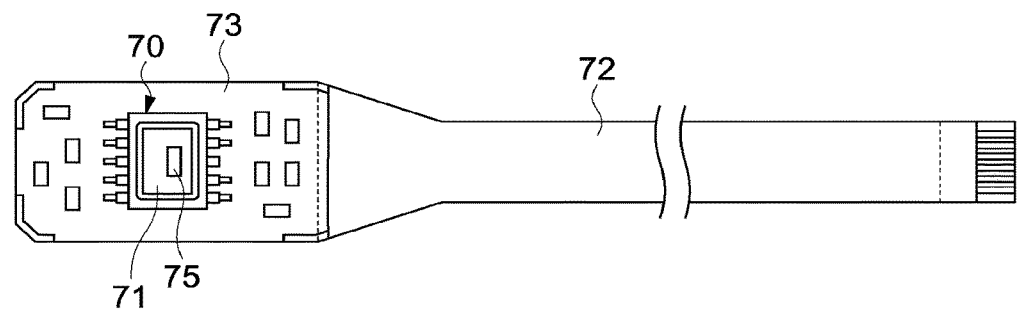
FIG. 8 is a diagram schematically showing an example of the structure of the sensor.
Figure 9:
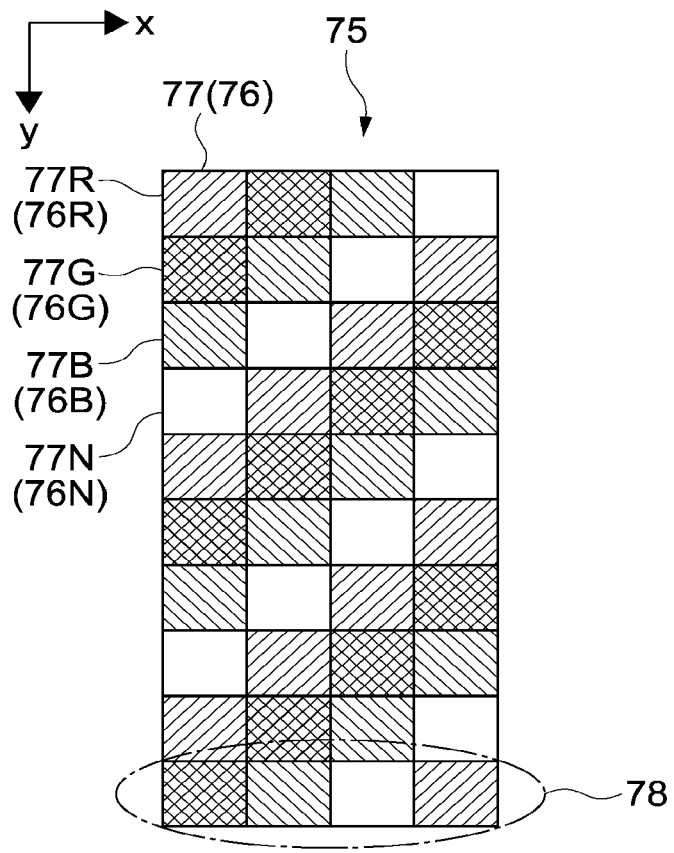
FIG. 9 is a diagram schematically showing a measuring area of the sensor.
Figure 9:
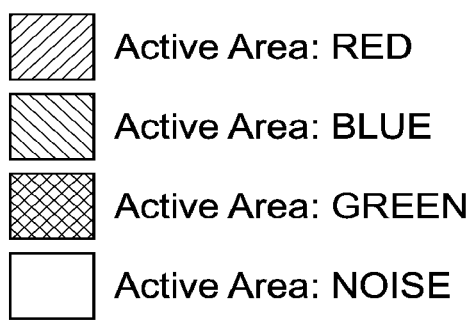

Each of FIG. 8 and FIG. 9 is a diagram schematically showing an example of the structure of the sensor 70. The sensor 70 is mounted on a circuit board 73. The circuit board 73 connects to a flexible circuit board 72. The sensor 70 measures the intensity of light, and outputs light intensity signals to the controller 60 of FIG. 1 or the like via the circuit board 73 and the flexible circuit board 72. Further, control signals and drive power are supplied to the sensor 70 and the circuit board 73.

The sensor 70 has the receiver surface 71. Part of the receiver surface 71 functions as a measuring area 75 (active area). FIG. 9 is a diagram schematically showing the measuring area 75 of the sensor 70. The sensor 70 includes a plurality of sensor units 76. The plurality of sensor units 76 are capable of measuring the intensity of incident light. In other words, the plurality of sensor units 76 are arranged in the measuring area 75. The plurality of sensor units 76 are two-dimensionally arranged in a first direction (X direction of FIG. 9) and a second direction (Y direction of FIG. 9). The first direction is orthogonal to the second direction. In this embodiment, the forty sensor units 76 are arranged in a matrix (4 in X direction×10 in Y direction).

Further, the sensor 70 includes a plurality of filters 77. The plurality of filters 77 are arranged on the plurality of sensor units 76, respectively. Each filter 77 transmits light having a predetermined wavelength band. In other words, the filters 77 are arranged on the forty sensor units 76, respectively. In this embodiment, the plurality of filters 77 include three kinds of filters, i.e., red filters 77R (first filters), green filters 77G (second filters), and blue filters 77B (third filters). The red filters 77R (first filters) transmit light having the red wavelength band. The green filters 77G (second filters) transmit light having the green wavelength band. The blue filters 77B (third filters) transmit light having the blue wavelength band.

When white diffracted light enters the measuring area 75, the sensor units 76, on which the red filters 77R are arranged, measure the intensity of red modulated light R. Similarly, the sensor units 76, on which the green filters 77G are arranged, measure the intensity of green modulated light G. The sensor units 76, on which the blue filters 77B are arranged, measure the intensity of blue modulated light B. For example, the average value of intensity measured by the plurality of sensor units 76, on which the filters 77 of the same color are arranged, is used.

As shown in FIG. 9, the plurality of filters 77 are arranged as follows. Each filter group 78 includes the three kinds of red, green, and blue filters 77R, 77G, and 77B aligned in the X direction. The plurality of filters 77 are further arranged as follows. The same kind of filters 77 out of the three kinds of filters 77R, 77G, and 77B are not adjacent to each other in the second direction. As a result, the three kinds of filters 77R, 77G, and 77B are arranged in the measuring area 75 in balance. As a result, even if diffracted light enters part of the measuring area 75 (e.g., upper portion or lower portion), it is possible to measure the intensity of RGB modulated lights with a high degree of accuracy. Note that the arrangement of the three kinds of filters 77R, 77G, and 77B may not be limited to the arrangement of FIG. 9, but may be selected as necessary.

Moreover, in this embodiment, the plurality of filters 77 include noise filters 77N (fourth filters). The three kinds of red, green, and blue filters 77R, 77G, and 77B transmit light containing noise components. The noise filters 77N transmit the light containing noise components. In other words, the noise filters 77N transmit light containing noise components passing through the red filters 77R, light containing noise components passing through the green filters 77G, and light containing noise components passing through the blue filters 77B.

Figure 10:
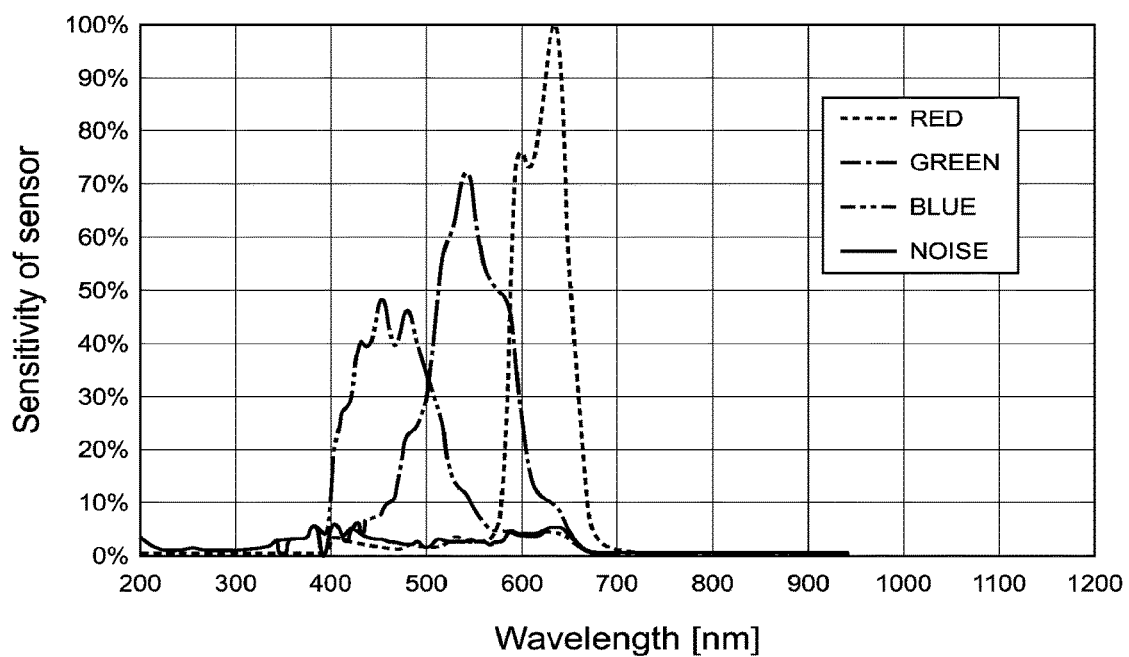
FIG. 10 is a graph showing sensitivity of sensor units including filters depending on wavelength.

FIG. 10 is a graph showing sensitivity of the sensor units 76 including the filters 77 depending on wavelength. Hereinafter, the sensor units 76, on which the red filters 77R are arranged, will be referred to as the red sensor units 76R. The sensor units 76, on which the blue filters 77B are arranged, will be referred to as the blue sensor units 76B. The sensor units 76, on which the green filters 77G are arranged, will be referred to as the green sensor units 76G. The sensor units 76, on which the noise filters 77N are arranged, will be referred to as the noise sensor units 76N.

As shown in the graph of FIG. 10, the red sensor units 76R detect light having the wavelength band of about 570 nm to about 700 nm with a high degree of sensitivity. The light having this wavelength band is light having a desired wavelength band. In addition to this light, the red sensor units 76R detect light having the wavelength band of about 400 nm to about 570 nm with a low degree of sensitivity, i.e., about 1 to 5%. The light having this wavelength band is light containing noise components. As a result, the intensity of light output from the red sensor units 76R contains the intensity of light having the noise components.

The green sensor units 76G detect light having the wavelength band of about 420 nm to about 650 nm, i.e., light having a desired wavelength band, with a high degree of sensitivity. In addition, the green sensor units 76G detect light having the wavelength band of about 200 nm to about 420 nm, i.e., light containing noise components, with a low degree of sensitivity, i.e., about 1 to 5%. The blue sensor units 76B detect light having the wavelength band of about 400 nm to about 580 nm, i.e., light having a desired wavelength band, with a high degree of sensitivity. In addition, the blue sensor units 76B detect light having the wavelength band of about 580 nm to about 660 nm, i.e., light containing noise components, with a low degree of sensitivity.

The noise filters 77N detect light having the wavelength band of about 200 nm to about 660 nm with a low degree of sensitivity, i.e., about 1 to 5%. Because of this, the noise sensor units 76N are capable of measuring the intensity of light detected by the RGB sensor units 76 as the noise components. The intensity of light containing noise components measured by the noise sensor units 76N is subtracted from the intensity of RGB lights measured by the RGB sensor units 76R, 76G, and 76B. As a result, it is possible to measure the intensity of the RGB modulated lights with a high degree of accuracy. For example, the measured RGB values (intensity of RGB lights) may be converted into the XYZ color system. In this case, the noise components are subtracted from the RGB values, and the obtained values are used for calculation.

As shown in FIG. 9, each filter group 78, which is arranged along the X direction, includes at least one noise filter 77N. Moreover, the noise filters 77N are not adjacent to each other in the Y direction. As a result, the noise filters 77N are arranged in the measuring area 75 in balance. It is possible to measure the intensity of RGB modulated lights with a high degree of accuracy.

Calibration is performed based on the intensity of light measured by the sensor units 76. According to the calibration, for example, it is possible to measure and correct the white balance (whiteness), and to measure and correct the color space. In other words, it is possible to measure and correct the degree of R, the degree of G, and the degree of B with a high degree of accuracy. Further, for example, it is possible to measure and correct gamma, and to perform various kinds of processing. For example, the image display apparatus 100 may include a brightness sensor. The brightness sensor adjusts the brightness of an image depending on the brightness of the surrounding area. In this case, for example, it is possible to correct the brightness adjusting function of the brightness sensor.

As described above, in the image display apparatus 100 of this embodiment, each liquid crystal panel 31 emits a modulated light beam. The sensor 70 receives the diffracted light D of the modulated light beam. Further, the intensity of the diffracted light D is measured as the intensity of the modulated light. As a result, it is possible to perform calibration with a simple structure and with a high degree of accuracy.

Figure 11A:
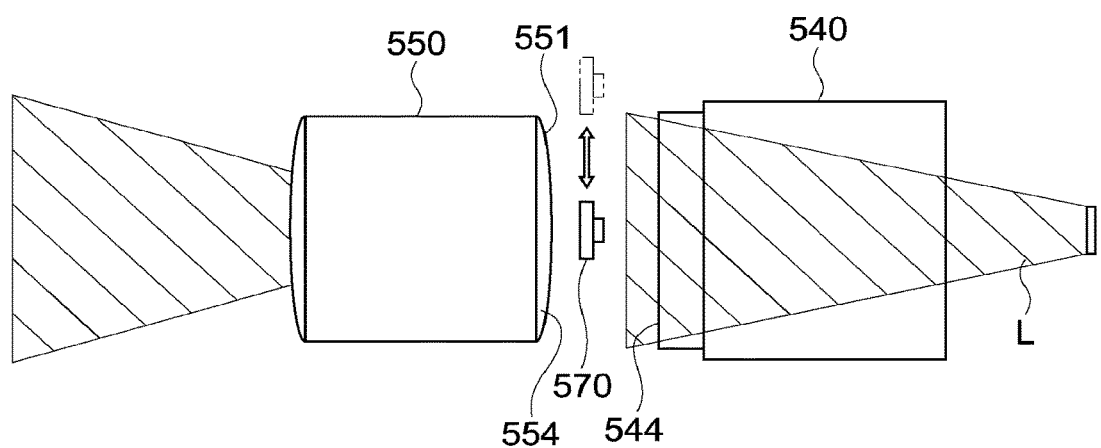
FIGS. 11A and 11B are diagrams schematically showing the structure of a calibration mechanism of a comparative example.
Figure 11B:
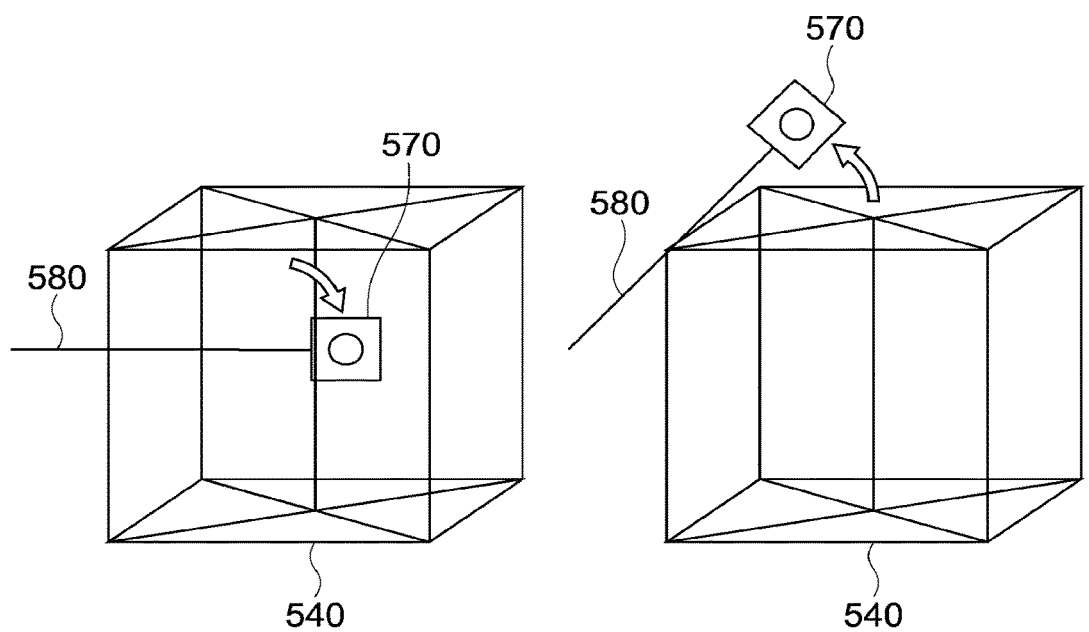

FIGS. 11A and 11B are diagrams schematically showing the structure of a calibration mechanism of a comparative example. For example, let's assume the case of FIG. 11A. A movable sensor 570 is arranged on a light path between a light synthesizer unit 540 and a projector optical system 550. When an image is displayed, the sensor 570 is at a position distant from a light beam L entering the projector optical system 550 and stands by. When performing calibration, the sensor 570 moves to the center of the light beam L or the like. Then the sensor 570 measures the intensity of the light.

FIG. 11B shows an example of a structure configured to move the sensor 570. Specifically, an arm 580 connected to the sensor 570 is used. The arm 580 rotates, and the sensor 570 thus moves correspondingly. Alternatively, another structure may be used in which the sensor 570 moves linearly.

As described above, the movable sensor 570 is used. In this case, the structure of the calibration mechanism becomes complicated. It is also complicated to drive and control the calibration mechanism. It is expensive to structure the calibration mechanism and to drive and control the calibration mechanism. Moreover, it is necessary for the sensor 570 to move to the sensor position with a high degree of accuracy. If there is variation in the sensor position, reproducibility is decreased. Moreover, when the sensor 570 receives light at the center of the light beam L, the sensor 570 is irradiated with high-density light. So it is necessary to increase durability. For example it is necessary to additionally provide a member such as a ND (Neutral Density) filter to reduce damage to the sensor 570. Such a member would increase costs.

Moreover, it is necessary to provide a space between the projector optical system 550 and the light synthesizer unit 540 to insert the movable sensor 570. For example, it is necessary to provide a space of at least about 6 mm between the emitter surface 544 of the light synthesizer unit 540 and the entrance surface 554 of the projector optical system 550. An air layer (about 1.0 mm), the ND filter (about 1.2 mm), the sensor (about 1.8 mm), a circuit board (about 1.0 mm), and an air layer (about 1.0 mm) are arranged in the space of at least about 6 mm. As a result, the size of the set including those members between the light synthesizer unit 540 and the projector optical system 550 is increased. Moreover, the length of back focus is increased. So it is necessary to provide the projector optical system 550 having a large entrance area 551. As a result, it is necessary to provide a larger lens or the like. Such a member would increase costs. As described above, in the case where the movable sensor 570 is used, various problems might arise.

According to the present technology, the diffracted light D from each liquid crystal panel 31 is sensed. So it is possible to prevent the above-mentioned problems from occurring. According to the calibration mechanism, it is possible to reduce costs, to make the structure simple, to omit a movable mechanism, and to increase reproducibility. In addition, it is not necessary to increase durability of the calibration mechanism. Note that the above-mentioned effects may not be attained simultaneously. All or some of the above-mentioned effects may be attained depending on conditions and the like.

For example, let's assume the following case. A sensor is arranged apart from a light beam entering a projector optical system. Other members such as a holder holding a light synthesizer unit and a frame of the projector optical system reflect light. The sensor receives the reflected scattered light, and measures the intensity of the scattered light. However, in this case, chromaticity of the light reflected by the other members is different from the original. Moreover, the intensity of the light is low. As a result, the sensor senses intensity of light with a very low degree of accuracy.

According to the present technology, the diffracted light D is sensed. So it is possible to design the sensor position and a diffracted order as necessary such that a desired position may be irradiated with the diffracted light D. As a result, it is possible to directly sense light, which has a spectrum same as the spectrum of normal light and has a large intensity. As a result, it is possible to sense the diffracted light D with a higher degree of accuracy.

Other Embodiments

The present technology is not limited to the above-mentioned embodiment, and other various embodiments may be implemented.

Figure 12:
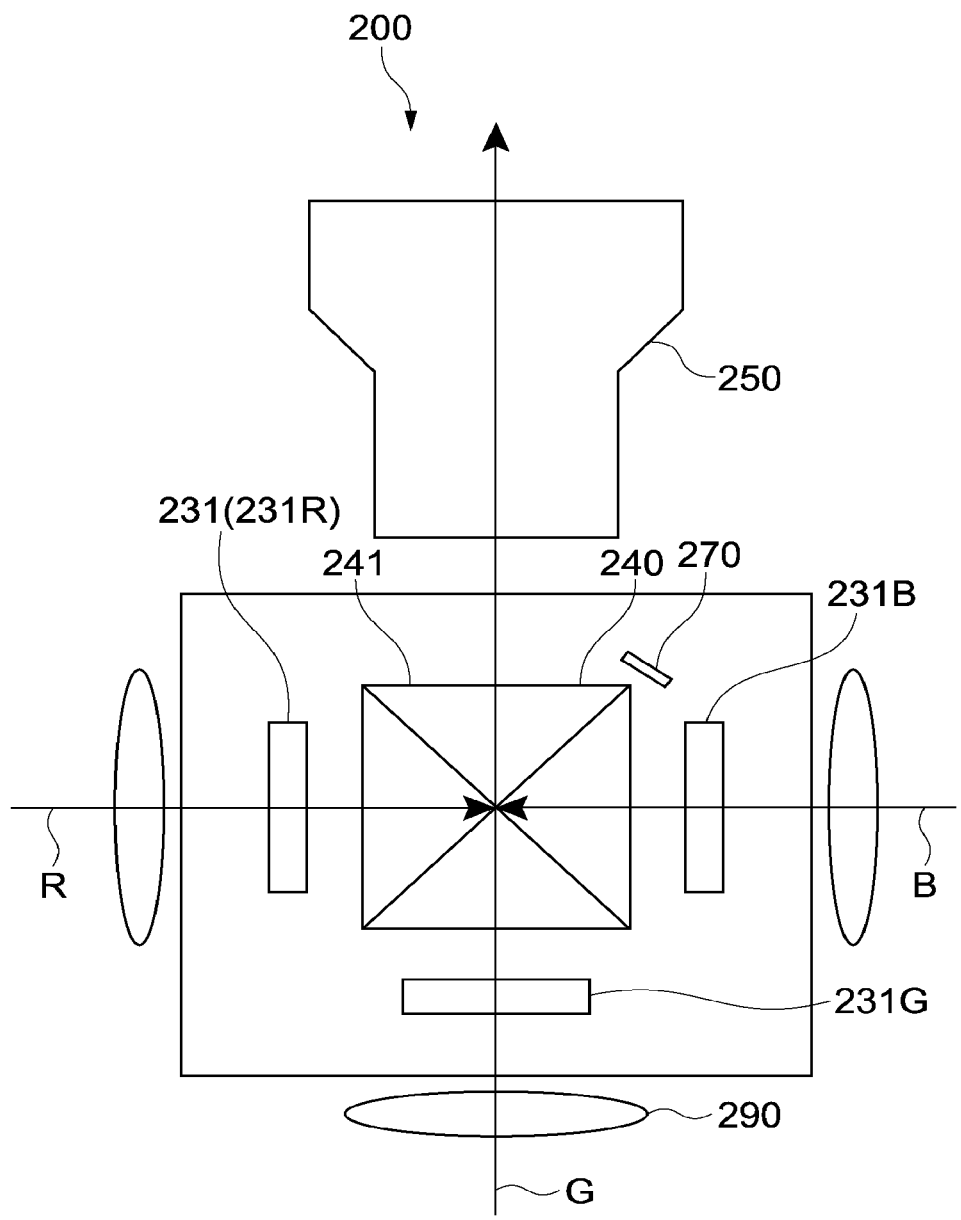
FIG. 12 is a diagram schematically showing an example of the structure of an image display apparatus according to another embodiment.

For example, FIG. 12 is a diagram schematically showing an example of the structure of an image display apparatus according to another embodiment. In the above-mentioned embodiment, as shown in FIG. 1, the reflective liquid crystal panels 31 are used as light modulation devices. Alternatively, the image display apparatus 200 of FIG. 12 includes transmissive liquid crystal panels 231 as the light modulation devices.

A light source unit (not shown) emits light containing red light R, green light G, and blue light B. Then a spectro-optical system (not shown) selectively divides the red light R, the green light G, and the blue light B. The red light R, the green light G, and the blue light B enter the RGB transmissive liquid crystal panels 231R, 231G, and 231B, respectively. For example, the spectro-optical system is a dichroic mirror, a relay lens, or a field lens 290 of FIG. 12. The field lens 290 parallelizes the red light R, the green light G, and the blue light B. After that, the red light R, the green light G, and the blue light B enter the liquid crystal panels 231R, 231G, and 231B, respectively. The liquid crystal panels 231R, 231G, and 231B modulate the red light R, the green light G, and the blue light B. The RGB modulated lights enter a light synthesizer unit 240. The light synthesizer unit 240 combines and synthesizes the RGB modulated light entering in three directions. The light synthesizer unit 240 emits the synthesized light to a projector optical system 250.

Each transmissive liquid crystal panel 231 includes a plurality of two-dimensionally arranged pixels. The plurality of pixels form a periodic structure. Each liquid crystal panel 231 thus generates diffracted light. For example, a sensor 270 is arranged in the vicinity of the emitter surface 241 of the light synthesizer unit 240. It is possible to sense diffracted light emitted from the liquid crystal panels 231 and having a predetermined order.

Figure 13:
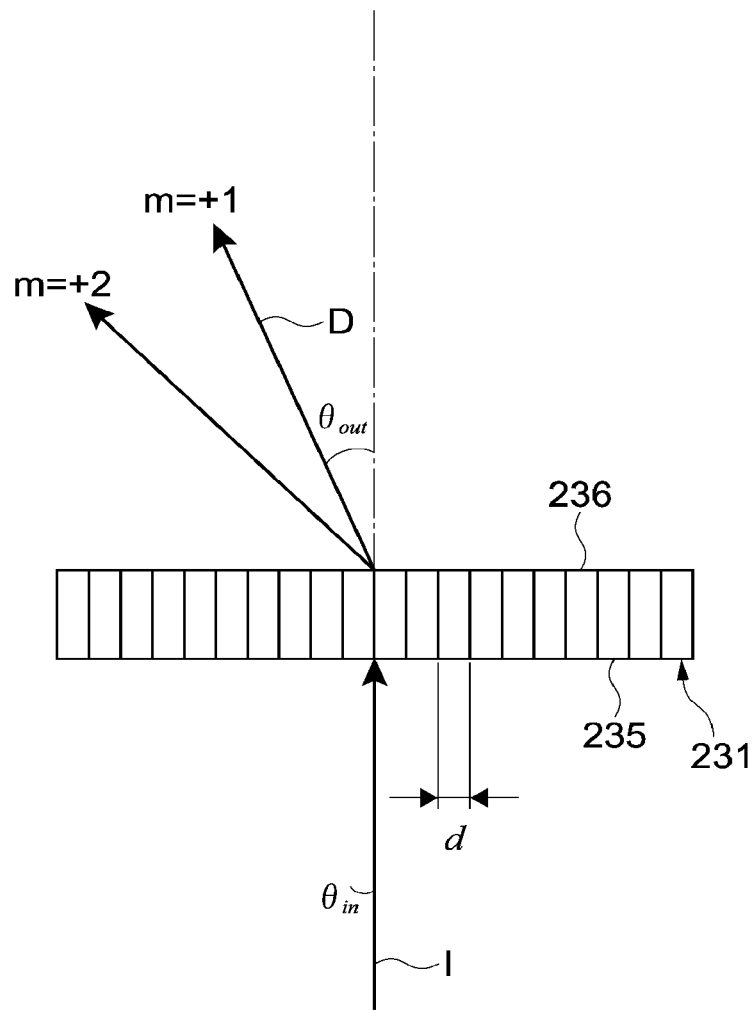
FIG. 13 is a diagram schematically illustrating diffracted light according to the other embodiment.

For example, as shown in FIG. 13, light I from a light source unit enters the entrance surface 235 of the liquid crystal panel 231 approximately perpendicularly. Then the emitter surface 236 of the liquid crystal panel 231 emits diffracted light D depending on the pixel pitch d and the wavelength λ. As described above, it is possible to calculate the position of the sensor 270 as necessary, and to receive the diffracted light D having a desired order. It is possible to perform calibration with a high degree of accuracy.

Moreover, digital micromirror devices (DMDs) or the like may be used as the light modulation devices. Each DMD includes a plurality of mirror devices corresponding to a plurality of pixels. The plurality of mirror devices form a periodic structure, and generate diffracted light. The diffracted light is sensed. As a result, it is possible to obtain effects similar to the above-mentioned effects. Moreover, the present technology is applicable to any light modulation device, which has a periodic structure and is capable of generating diffracted light.

As described above, three RGB light modulation devices are used, and a color image is produced. However, the number of the light modulation devices is not limited. For example, the present technology is applicable to an image display apparatus including only one light modulation device. Moreover, the present technology is applicable to an image display apparatus including an arbitrary number of light modulation devices. As a matter of course, one light modulation device may produce a color image.

Note that the effects described in the present disclosure are merely examples. Effects are not limited to the above-mentioned effects. Effects other than the above-mentioned effects may be attained. The above-mentioned effects are not necessarily attained simultaneously. All or some of the above-mentioned effects may be attained depending on conditions and the like. As a matter of course, effects not described in the present disclosure may be attained.

At least two of the features of the above-mentioned embodiments may be combined. In other words, the various features described in the embodiments may be combined as necessary irrespective of the embodiments.

Note that the present technology may employ the following structures.

(1) An image display apparatus, comprising:
 a light source unit;
 at least one light modulation device configured
 to modulate light from the light source unit, and
 to emit a modulated light beam; and
 a sensor configured
 to receive diffracted light of the modulated light beam emitted from the at least one light modulation device, and
 to measure intensity of the modulated light.

(2) The image display apparatus according to (1), wherein
 the sensor is arranged on a light path of the diffracted light of the light beam, the diffracted light having a predetermined order.

(3) The image display apparatus according to (1) or (2), wherein
 the at least one light modulation device includes a plurality of two-dimensionally arranged pixels, the plurality of two-dimensionally arranged pixels forming a periodic structure, the periodic structure being configured to generate the diffracted light.

(4) The image display apparatus according to any one of (1) to (3), further comprising:
 a projector configured to project incident light, wherein
 the sensor is configured to receive diffracted light failing to enter the projector out of the diffracted light of the light beam.

(5) The image display apparatus according to (4), wherein
 light from the light source unit enters the at least one light modulation device approximately perpendicularly, and
 the sensor is configured to receive diffracted light having the smallest absolute value of an order out of the diffracted light failing to enter the projector.

(6) The image display apparatus according to any one of (1) to (5), wherein
 the light source unit is capable of emitting light containing red light, green light, and blue light,
 the at least one light modulation device includes three light modulation devices, the three light modulation devices being configured to modulate the red light, the green light, and the blue light, respectively,
 the image display apparatus further comprises a synthesizer unit, the synthesizer unit being configured to synthesize red modulated light, green modulated light, and blue modulated light modulated by the three light modulation devices, and
 the sensor is configured
 to receive diffracted light of a light beam synthesized by the synthesizer unit, and
 to measure intensity of the red modulated light, the green modulated light, and the blue modulated light.

(7) The image display apparatus according to (6), wherein
 the synthesizer unit includes an emitter surface configured to emit the synthesized light beam, and
 the sensor is arranged in the vicinity of the emitter surface.

(8) The image display apparatus according to (6) or (7), wherein the sensor includes
a plurality of sensor units capable of measuring intensity of incident light, and
a plurality of filters arranged on the plurality of sensor units, respectively, the plurality of filters being configured to transmit light having a predetermined wavelength band.

(9) The image display apparatus according to (8), wherein the plurality of filters include three kinds of filters, the three kinds of filters being
first filters configured to transmit light having a red wavelength band,
second filters configured to transmit light having a green wavelength band, and
third filters configured to transmit light having a blue wavelength band,
the plurality of sensor unit are two-dimensionally arranged in a first direction and a second direction, the first direction and the second direction being orthogonal to each other, and
in arrangement of the plurality of filters, a group of filters aligned in the first direction includes the three kinds of filters, and the same kinds of filters out of the three kinds of filters fail to adjacent to each other in the second direction.

(10) The image display apparatus according to (9), wherein the plurality of filters include fourth filters, the fourth filters being configured to transmit light having a noise component, the three kinds of filters being configured to transmit the light having the noise component, and
in the arrangement of the plurality of filters, the group of filters aligned in the first direction includes the fourth filter, and the fourth filters fail to adjacent to each other in the second direction.

(11) The image display apparatus according to any one of (1) to (10), further comprising:
a controller capable of controlling at least one of the light source unit and the at least one light modulation device based on the measured intensity of the modulated light.

It should be understood by those skilled in the art that various modifications, combinations, sub-combinations and alterations may occur depending on design requirements and other factors insofar as they are within the scope of the appended claims or the equivalents thereof.

What is claimed is:

1. An image display apparatus, comprising:
a light source;
at least one light modulation device configured to
modulate light from the light source, and
emit a modulated light beam;
a sensor including a plurality of sub-sensors ordered in a grid, each sub-sensor is configured to
receive diffracted light of the modulated light beam emitted from the at least one light modulation device, and
measure an intensity of the modulated light; and
a plurality of filters, each filter arranged upon a different corresponding sub-sensor of the plurality of sub-sensors and configured to transmit light of a predetermined wavelength band to the corresponding sub-sensor, wherein
the plurality of filters includes a noise filter that transmits light that includes noise components.

2. The image display apparatus according to claim 1, wherein the plurality of sub-sensors are configured to measure an intensity of incident light.

3. The image display apparatus according to claim 1, wherein the at least one light modulation device includes a plurality of two-dimensionally arranged pixels, the plurality of two-dimensionally arranged pixels forming a periodic structure, and the periodic structure being configured to generate the diffracted light of the modulated light beam.

4. The image display apparatus according to claim 1, wherein the plurality of sub-sensors are configured to receive diffracted light failing to enter a projector out of the diffracted light of the modulated light beam.

5. The image display apparatus according to claim 1, wherein the plurality of sub-sensors are arranged on a light path of the diffracted light of the modulated light beam, the diffracted light of the modulated light beam having a predetermined order.

6. The image display apparatus according to claim 1, further comprising circuitry configured to control at least one of the light source and the at least one light modulation device based on the measured intensity of the modulated light.

7. The image display apparatus according to claim 1, wherein
the plurality of filters further include three kinds of filters, the three kinds of filters being:
first filters configured to transmit light having a red wavelength band,
second filters configured to transmit light having a green wavelength hand, and
third filters configured to transmit light having a blue wavelength band,
a group of filters, of the plurality of filters, are aligned in a first direction of the grid,
the group of filters includes the three kinds of filters, and
the three kinds of filters included in the group of filters are not adjacent to each other in a second direction of the grid.

8. The image display apparatus according to claim 7, wherein
the group of filters aligned in the first direction includes the noise filter, and
the noise filter is not adjacent to another noise filter in the second direction.

9. The image display apparatus of claim 1, wherein the plurality of filters further includes
a first filter that transmits light of a first predetermined wavelength band,
a second filter that transmits light of a second predetermined wavelength band, and
a third filter that transmits light of a third predetermined wavelength band.

10. A control method, comprising:
receiving diffracted light of a modulated light beam emitted from a light modulation device, the light modulation device being configured to modulate light from a light source and to emit the modulated light beam;
measuring, using a sensor, an intensity of the modulated light, the sensor including plurality of sub-sensors ordered in a grid, each sub-sensor receiving the diffracted light of the modulated light beam;
controlling at least one of the light source and the light modulation device based on the measured intensity of the modulated light; and
transmitting, using a plurality of filters arranged on the sensor, each filter of the plurality of filters is arranged upon a different corresponding sub-sensor of the plurality of sub-sensors, light of a predetermined wavelength band to the corresponding sub-sensor, wherein
the plurality of filters includes a noise filter that transmits light that includes noise components.

11. The control method of claim 10, further comprising:
measuring, using the plurality of sub-sensors, intensity of incident light.

12. The control method of claim 10, wherein the light modulation device includes a plurality of two-dimensionally arranged pixels, the plurality of two-dimensionally arranged pixels forming a periodic structure, and the periodic structure being configured to generate the diffracted light of the modulated light beam.

13. The control method of claim 10, further comprising:
receiving, using the plurality of sub-sensors, diffracted light failing to enter a projector out of the diffracted light of the modulated light beam.

14. The control method of claim 10, wherein the plurality of sub-sensors are arranged on a light path of the diffracted light of the modulated light beam, the diffracted light of the modulated light beam having a predetermined order.

15. The control method of claim 10, further comprising:
transmitting, using first filters of the plurality of filters, light having a red wavelength band;
transmitting, using second filters of the plurality of filters, light having a green wavelength band; and
transmitting, using third filters of the plurality of filters, light having a blue wavelength band, wherein
a group of filters, of the plurality of filters, are aligned in a first direction of the grid,
the group of filters includes the first filters, the second filters, and the third filters, and
the first filters, the second filters, and the third filters included in the group of filters are not adjacent to each other in a second direction of the grid.

16. The control method of claim 15, further comprising:
transmitting, using the noise filter, light having a noise component, wherein
the group of filters aligned in the first direction includes the noise filter, and
the noise filter is not adjacent to another noise filter in the second direction.

17. The control method of claim 10, wherein the plurality of filters further includes
a first filter that transmits light of a first predetermined wavelength band,
a second filter that transmits light of a second predetermined wavelength band, and
a third filter that transmits light of a third predetermined wavelength band.

* * * * *